(12) United States Patent
Chang et al.

(10) Patent No.: US 10,061,921 B1
(45) Date of Patent: Aug. 28, 2018

(54) METHODS AND SYSTEMS FOR DETECTING COMPUTER SECURITY THREATS

(71) Applicant: Trend Micro Incorporated, Tokyo (JP)

(72) Inventors: Sheng Che Chang, Taipei (TW); Chun Wen Chang, Taipei (TW); Nai-Wei Chang, Taipei (TW); Meng-Che Lee, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 75 days.

(21) Appl. No.: 15/430,903

(22) Filed: Feb. 13, 2017

(51) Int. Cl.
*G06F 21/00* (2013.01)
*G06F 21/55* (2013.01)

(52) U.S. Cl.
CPC ...... *G06F 21/554* (2013.01); *G06F 2221/034* (2013.01)

(58) Field of Classification Search
CPC .................. G06F 21/554; G06F 2221/034
See application file for complete search history.

(56) References Cited

U.S. PATENT DOCUMENTS

| | | | |
|---|---|---|---|
| 7,694,150 B1 | 4/2010 | Kirby | |
| 8,230,262 B2 | 7/2012 | Li et al. | |
| 9,104,864 B2 | 8/2015 | Penton et al. | |
| 9,117,078 B1* | 8/2015 | Chien | G06F 21/566 |
| 2010/0229239 A1* | 9/2010 | Rozenberg | G06F 21/552 |
| | | | 726/24 |
| 2014/0215616 A1* | 7/2014 | Bhatt | G06F 21/554 |
| | | | 726/23 |
| 2015/0082441 A1* | 3/2015 | Gathala | G06F 9/541 |
| | | | 726/25 |
| 2016/0012224 A1* | 1/2016 | Zhou | H04L 63/1416 |
| | | | 726/23 |
| 2016/0285897 A1* | 9/2016 | Gantman | G06N 99/005 |
| 2017/0270299 A1* | 9/2017 | Kim | G06N 5/022 |

\* cited by examiner

*Primary Examiner* — Ghodrat Jamshidi
(74) *Attorney, Agent, or Firm* — Okamoto & Benedicto LLP

(57) ABSTRACT

A behavior of a computer security threat is described in a root-cause chain, which is represented by a detection rule. The detection rule includes the objects of the root-cause chain and computer operations that represent links of the root-cause chain. An endpoint computer establishes a link between objects described in the detection rule when a corresponding computer operation between the objects is detected. Detected computer operations are accumulated to establish the links between objects. The threat is identified to be in the computer when the links of the detection rule have been established.

12 Claims, 6 Drawing Sheets

METHODS AND SYSTEMS FOR DETECTING COMPUTER SECURITY THREATS

BACKGROUND OF THE INVENTION

1. Field of the Invention

The present invention relates generally to computer security, and more particularly but not exclusively to methods and systems for detecting computer security threats.

2. Description of the Background Art

A computer security product at an endpoint computer may detect computer security threats by pattern matching. The pattern may include signatures of static features of the threats, such as hashes of malicious code (e.g., Sha1 or Md5 of malicious files and processes), network identifiers (e.g., Internet Protocol (IP) address, Domain Name System (DNS) name) of malicious computers (e.g., malicious websites, command and control (C&C) sites of botnets and dropped malware), etc. One problem with the pattern matching approach is that it is impossible to obtain the signatures of all threats, especially those of particular threats that have not been analyzed by computer security experts.

SUMMARY

In one embodiment, a behavior of a computer security threat is described in a root-cause chain, which is represented by a detection rule. The detection rule includes the objects of the root-cause chain and computer operations that represent links of the root-cause chain. An endpoint computer establishes a link between objects described in the detection rule when a corresponding computer operation between the objects is detected. Detected computer operations are accumulated to establish the links between objects. The threat is identified to be in the computer when the links of the detection rule have been established.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
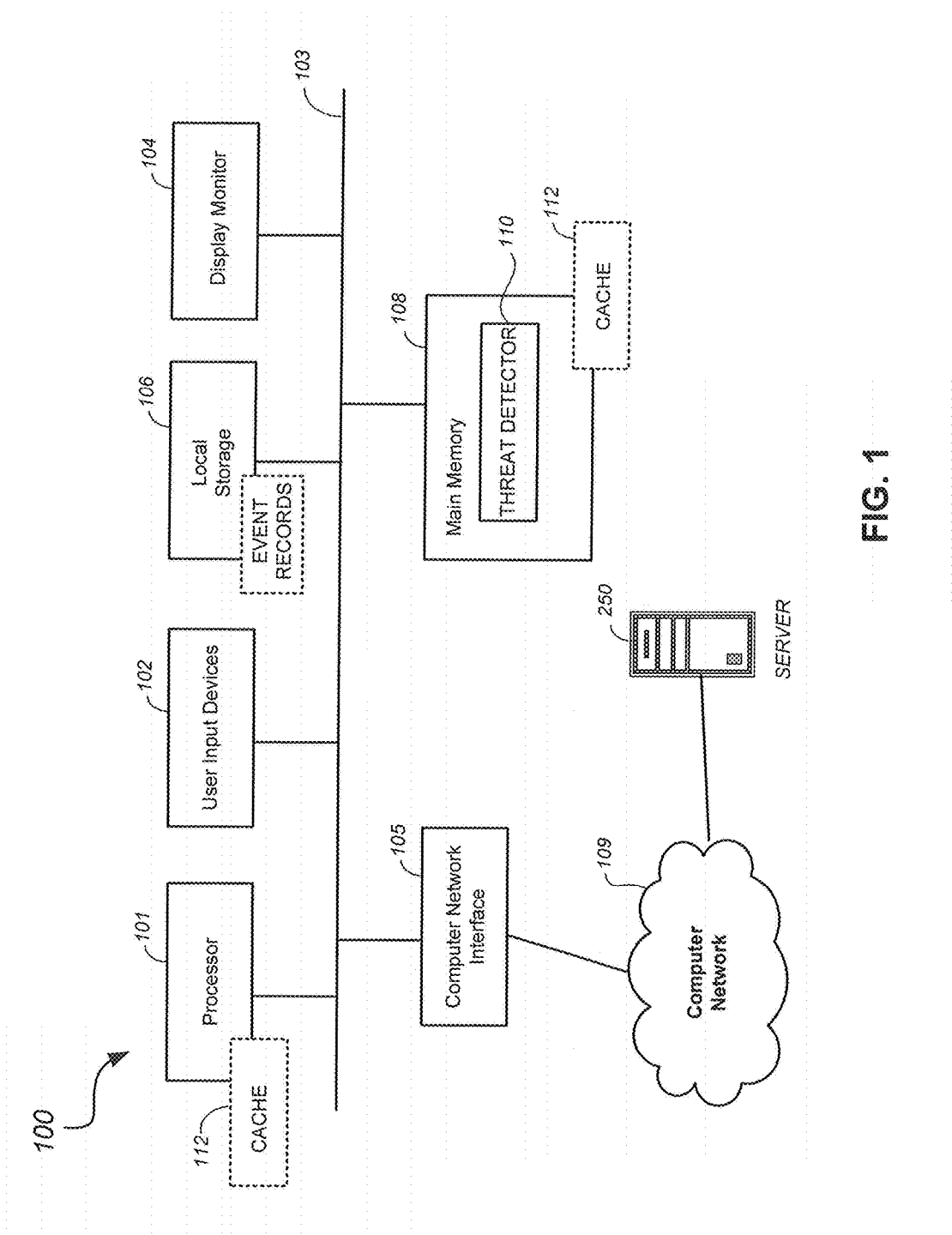
FIG. 1 shows a schematic diagram of a computer for detecting computer security threats in accordance with an embodiment of the present invention.

Referring now to FIG. 1, there is shown a schematic diagram of a computer 100 in accordance with an embodiment of the present invention. In one embodiment, the computer 100 is configured as an endpoint computer for detecting computer security threats ("threats"). The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more local storage 106, a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet. The computer 100 may work in conjunction with a server 250, which may comprise a support server computer for supporting the threat detection function of the computer 100. The computer 100 and the server 250 may communicate over the computer network 109.

The local storage 106 comprises a data storage device (e.g., hard disk drive, solid state drive) that is local to the computer 100. The local storage 106 may store event records of threat events that have been detected in the computer 100. A subset of information of the event records may be cached in a cache memory 112, which may be cache memory of the processor 101, memory locations in the main memory 108, or some other high-speed memory. For performance reasons, the cached event records may be searched before searching the event records in the local storage 106.

The computer 100 is a particular machine as programmed with one or more software modules, comprising instructions stored non-transitory in the main memory 108 for execution by the processor 101 to cause the computer 100 to perform corresponding programmed steps. An article of manufacture may be embodied as computer-readable storage medium including instructions that when executed by the processor 101 cause the computer 100 to be operable to perform the functions of the one or more software modules. In the example of FIG. 1, the software modules comprise a threat detector 110 for detecting computer security threats, such as various forms of malware (e.g., rootkits, spyware, ransomware, viruses, processes containing malicious code). The threat detector 110 improves the functionality of the computer 100 by detecting threats that would otherwise slow down or compromise the computer 100, hold the computer 100 hostage, hijack the computer 100, etc.

Figure 2:
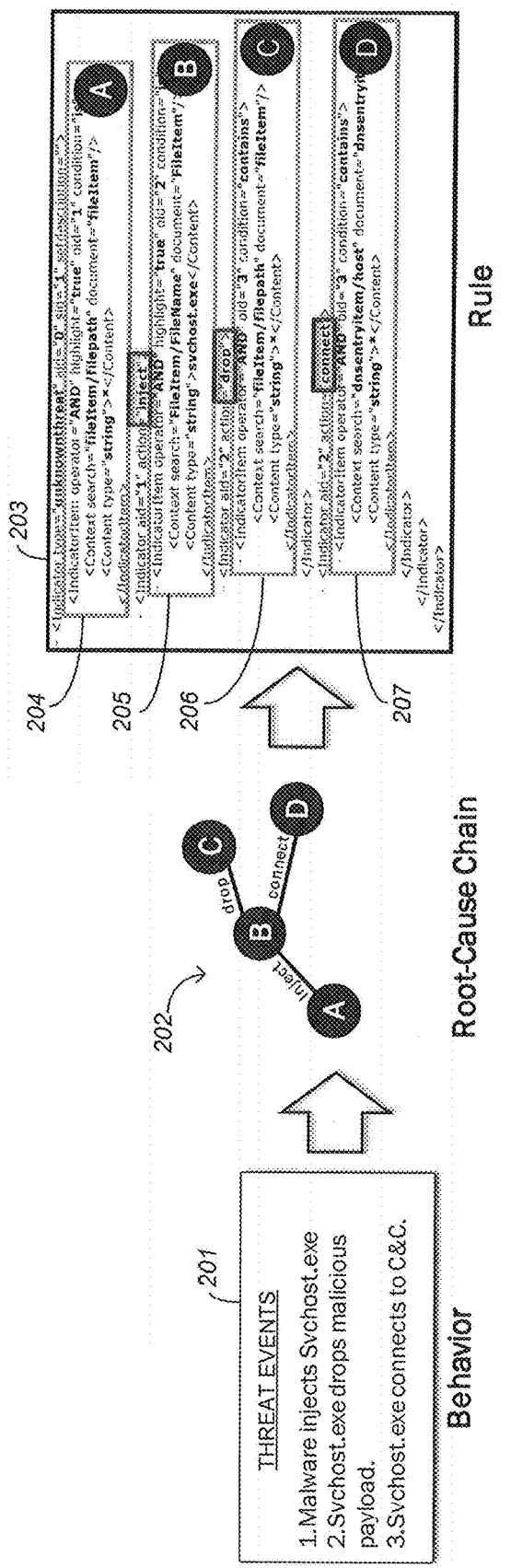
FIG. 2 shows a flow diagram of a method of creating a rule for detecting a computer security threat in accordance with an embodiment of the present invention.

FIG. 2 shows a flow diagram of a method of creating a rule for detecting a computer security threat in accordance with an embodiment of the present invention. In the example of FIG. 2, the threat that is being detected is unknown in that it is not a particular known threat that has been analyzed by computer security experts. In the example of FIG. 2, a malware behavior 201 comprises a series of threat events that each corresponds to a behavior that a threat may perform in an endpoint computer. The behavior 201 may be described by computer security experts based on observed behavior of known threats. However, the behavior 201 does not necessarily describe the behavior of a particular known threat. In the example of FIG. 2, the behavior 201 describes three threat events, namely a process injects malicious code into a process of the Windows operating system service host ("svchost.exe"), the injected process drops a malicious payload, and the injected process links to a C&C site to "phone home." The behavior 201 is provided as an example; embodiments of the present invention apply to other threat behaviors.

A threat event is a computer operation that may be performed by malware or other threats. Examples of these computer operations include process injection, linking to another computer over a computer network, dropping a payload (e.g., downloading a file), etc. Because a threat event may involve computer operations that are also performed by legitimate programs, a single threat event by itself is not necessarily indicative of presence of a threat.

In the example of FIG. 2, the malware behavior 201 is converted to a root-cause chain 202, which defines a threat by chains of linked objects. In the example of FIG. 2, the root-cause chain 202 has four objects, namely objects A, B, C, and D, with each object being represented by a node in the root-cause chain 202. An object may be a Named Object that is the actor or target of a computer operation, such as a file, a process, a network address, etc. In one embodiment, a threat event is described as objects that are linked in the root-cause chain 202. A link in the root-cause chain 202 is deemed to have been established (i.e., traversed) when a computer operation described by the link and performed in conjunction with objects connected by the link is detected.

In the example of FIG. 2, the root-cause chain 202 describes a first threat event where the object A injects some code in the object B, a second threat event where the object B drops the object C, and a third threat event where the object B connects to the object D. In one embodiment, the initial object that starts the root-cause chain 202 is referred to as the "initial object" and an object that is linked to the initial object or another object is referred to as a "linked object." In the example of FIG. 2, the object A is the initial object and the object B is a linked object that is directly linked to the initial object A, the object C is directly linked to the object B and is indirectly linked to the initial object A, and the object D is directly linked to the object B and is indirectly linked to the object C and the initial object A.

The root-cause chain 202 describes the behavior 201 without being limited to particular objects A, B, C, and D. That is, the object A does not have to be the particular malware that performed the process injection, the object B does not have to be the process of "svchost.exe", etc. The root-cause chain 202 accordingly does not necessarily describe a particular known threat, but also other threats that are yet to be discovered in the wild. This is particularly advantageous in detecting threats that have been created using malware toolkits.

In the example of FIG. 2, the root-cause chain 202 is converted to a detection rule 203. In the example of FIG. 2, the root-cause chain 202 is converted to the detection rule 203 in XML (i.e., eXtensible Markup Language) format. The detection rule 203 is thus another representation of the objects and links between the objects of a root-cause chain that defines a threat. The computer 100 may maintain a plurality of detection rules, one for each threat.

In one embodiment, the detection rule 203 describes the objects and links between the objects of the root-cause chain 202. In the example of FIG. 2, the detection rule 203 includes object descriptions 204-207, one for each object in the root-cause chain 202. More particularly, an object description 204 describes the object A, an object description 205 describes the object B, an object description 206 describes the object C, and an object description 207 describes the object D. In the example of FIG. 2, the detection rule 203 describes the link between the object descriptions 204 and 205 (see FIG. 2, action="inject"), the link between the object descriptions 205 and 206 (see FIG. 2, action="drop"), and the link between the object descriptions 205 and 207 (see FIG. 2, action=connect"). In one embodiment, the rule 203 is deemed to have been matched, i.e., the threat is detected, when all of its conditions for linking the objects have been satisfied. That is, the threat defined by the rule 203 is detected/identified when all the links of the rule 203 have been established. Put yet another way, in terms of the root-cause chain 202, this means that the threat described by the behavior 201 is detected when all the links between the objects of the root-cause chain 202 have been traversed.

Figure 3:
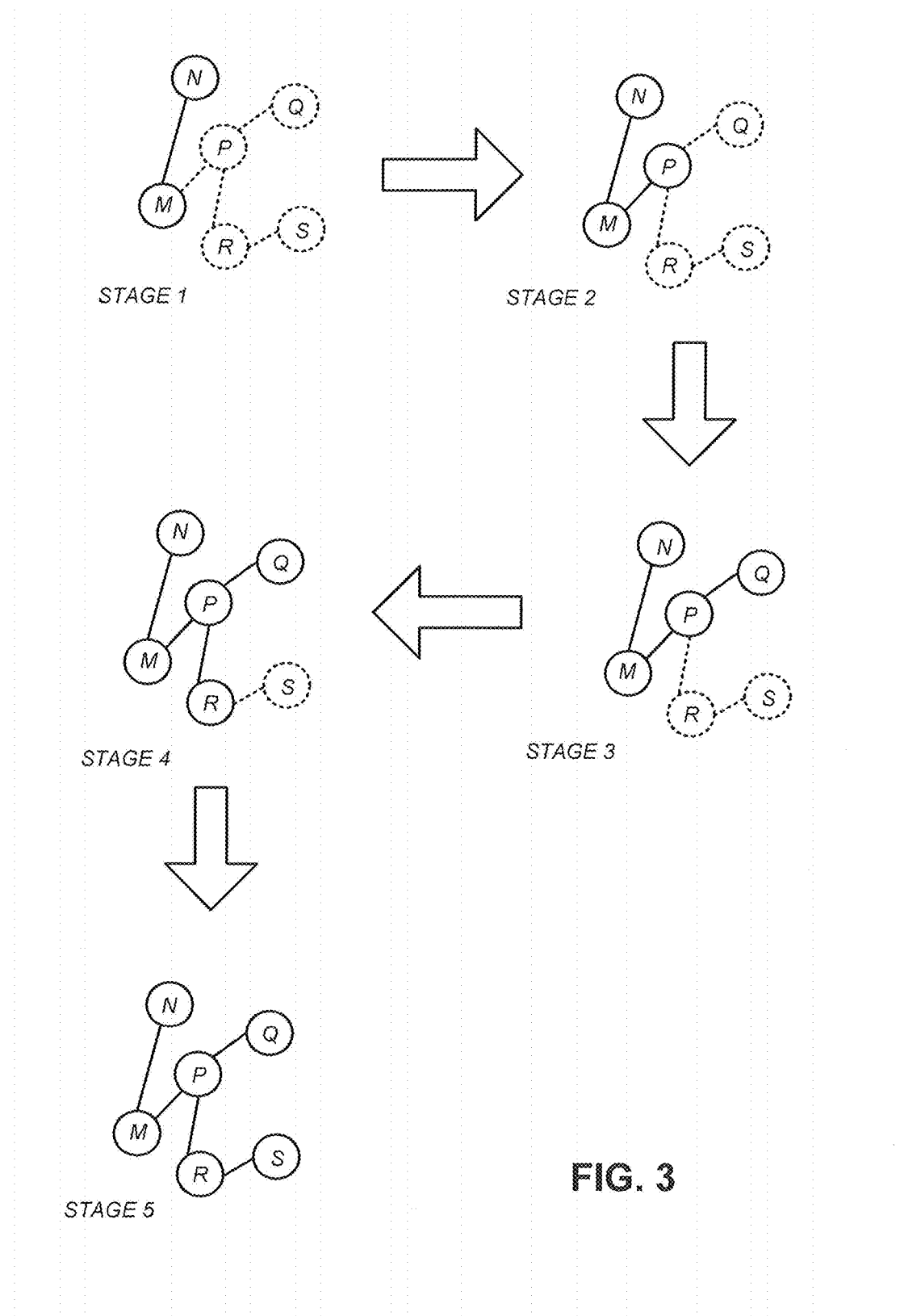
FIG. 3 shows a graphical illustration of detecting computer security threats in accordance with an embodiment of the present invention.

FIG. 3 shows a graphical illustration of detecting computer security threats in accordance with an embodiment of the present invention. Generally speaking, threat events described by a root-cause chain may occur at different points in time. Advantageously, a root-cause chain is still able to detect the threat that caused the threat events by linking the objects of the root-cause chain. Establishing the links between objects may be performed in sequential fashion, by accumulating detected computer operations that are threat events.

In the example of FIG. 3, the root-cause chain has objects M, N, P, Q, R, and S. As explained, the objects and links of the root-cause chain may be represented by a detection rule, which may be in the XML format. In the example of FIG. 3, a solid circle/line indicates an object/link that has been detected/established; a dotted circle/line indicates an object/link that has not been detected/established.

The detection of the threat starts by monitoring for computer operations that involve an initial object. In the example of FIG. 3, the object M is the initial object of the root-cause chain. In a first stage of detection (FIG. 3, "Stage 1"), a new event record is created when the endpoint computer detects a computer operation performed by an initial object with another object, which in this case is detection of the object M being linked to the object N. Generally speaking, the creation of the new event record starts the accumulation of computer operations involving objects and links between objects of the root-cause chain. As explained, the root-cause chain may be described in terms of a detection rule written in a suitable programming language for implementation in the endpoint computer. In the example of FIG. 3, detecting the computer operation linking the object M to object N in the first stage of detection establishes the link between the objects M and N, i.e., the link between the object M to the object N has been traversed.

To accumulate detection of remaining computer operations described in the detection rule, the event record is updated when the endpoint computer detects another computer operation performed by the initial object or an already linked object and meeting the condition to link to the initial object or to link to the already linked object. In the example of FIG. 3, in a second stage of detection (FIG. 3, "Stage 2"), another computer operation performed by the object M with the object P is detected by the endpoint computer. Accordingly, the event record is correspondingly updated, and the link between the objects M and P is deemed to have been established.

In general, the above-described process of detecting and accumulating computer operations involving objects of the root-cause chain is repeated until all links have been established. That is, in the third (FIG. 3, "Stage 3"), fourth (FIG. 3, "Stage 4"), and fifth (FIG. 3, "Stage 5") stages of detection, computer operations linking the objects P, Q, R, and S to other objects are detected. The accumulation of detected computer operations involving the objects M, N, P, Q, R, and S continue until all the links have been established, as in the fifth stage of detection (FIG. 3, "Stage 5"). At that stage, the threat defined by the detection rule is deemed to have been identified in the endpoint computer and, in response, a remedial action is performed, such as alerting the administrator (e.g., logging or raising an alarm), reporting detection of the threat to the server 250, etc.

Figure 4:
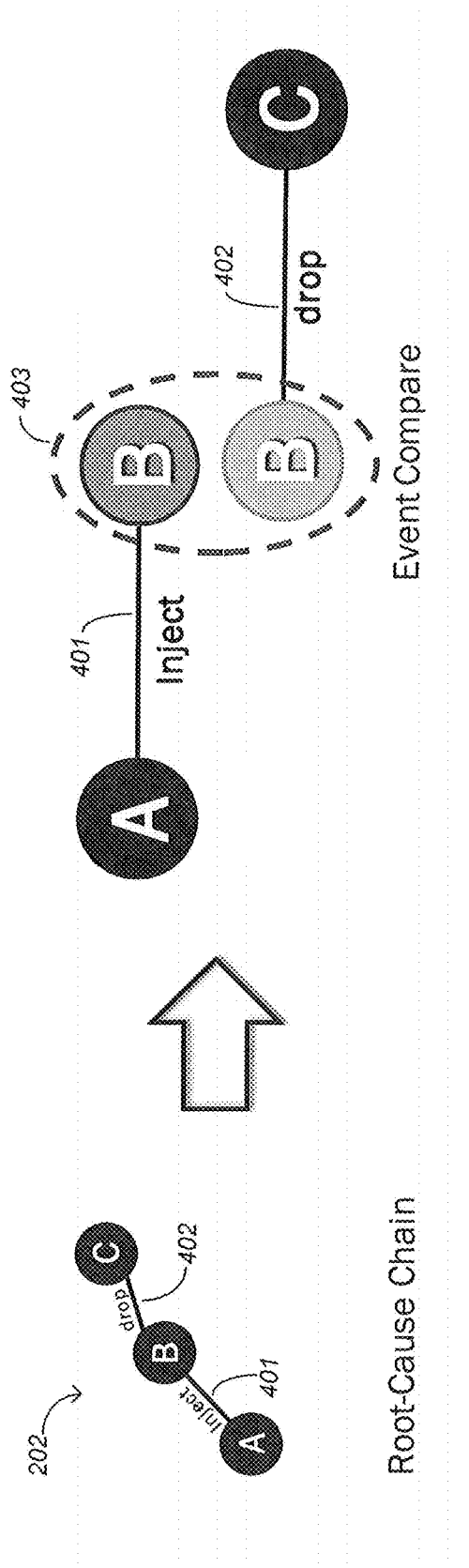
FIG. 4 shows a graphical illustration of detecting computer security threats in accordance with an embodiment of the present invention.

FIG. 4 shows a graphical illustration of detecting computer security threats in accordance with an embodiment of the present invention. FIG. 4 provides a particular example of establishing links between objects of the root-cause chain 202.

In the example of FIG. 4 a link 401 describes a threat event where a computer operation links the initial object A to the object B, and a link 402 describes a threat event where a computer operation links the object B to the object C. Each of the links 401 and 402 may be described in the detection rule 203 (FIG. 2, 203). In the example of FIG. 4, the threat event of the link 401 is a computer operation where a process (object A) injects code into another process (object B), and the threat event of the link 402 is a computer operation where the injected process (object B) drops a payload (object C). When the computer operation of the link 401 is detected, e.g., a process injects another process with code (e.g., malicious code), a new event record is created to indicate detecting the initial object being linked to another object. Thereafter, when the computer operation of the link 402 is detected, e.g., the injected process dropped a payload (e.g., executable file), an event comparison (see 403) is performed to determine whether the object B in the threat event described by the link 401 is the same as the object B in the threat event described by link 402. That is, the event comparison determines whether or not the process that has been injected with code in the initial threat event is the same process that has dropped a payload in the subsequent threat event. If so, the link 401 and the link 402 have been established and the event record is accordingly updated. In one embodiment, process comparisons are facilitated by storing a process' Process ID, full path, and hash in the corresponding event record. A payload, DNS server name, and network address may be identified by its hash value. As can be appreciated, the unique identifier and other information for a particular object depend on the type of the object.

Figure 5:
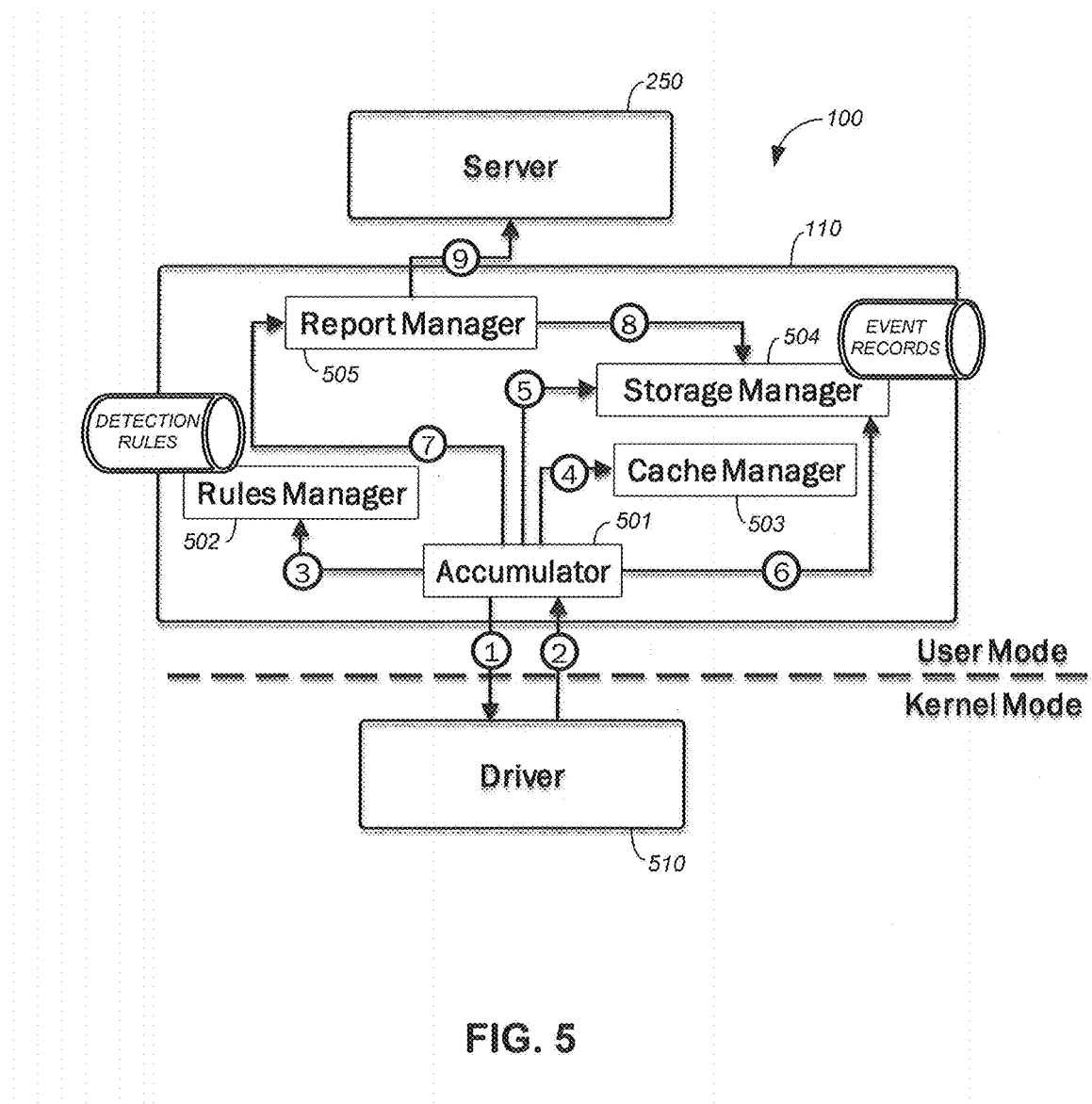
FIG. 5 shows a system for detecting computer security threats in accordance with an embodiment of the present invention.

FIG. 5 shows a system for detecting computer security threats in accordance with an embodiment of the present invention. In the example of FIG. 5, the system includes the server 250 and the computer 100. The computer 100 may execute the instructions of the threat detector 110 in user mode and the instructions of a kernel driver 510 in kernel mode. The driver 510 may comprise a kernel driver of the operating system (e.g., Microsoft Windows™ operating system) of the computer 100.

In the example of FIG. 5, the accumulator 501 registers with the kernel driver 510 (FIG. 5, arrow 1) one or more computer operations of corresponding threat events described in a plurality of detection rules maintained by a rules manager 502. Accordingly, when the kernel driver 510 detects a registered computer operation as being performed in the computer 100, the kernel driver 510 reports the computer operation, along with objects and other information of the computer operation, to the accumulator 510 (FIG. 5, arrow 2).

The rules manager 502 provides an interface to allow the accumulator 501 to check if a computer operation is described in the detection rules. In one embodiment, the rules manager 502 reads detection rules that are written in XML format and stores the detection rules into memory as a tree-like with linked list structure. In response to detecting the computer operation, the accumulator 501 consults with the rules manager 502 to determine if an object involved in the computer operation is an initial object in any of the detection rules (FIG. 5, arrow 3). If so, the accumulator 501 creates a corresponding new event record that is stored in the local storage 106 (shown in FIG. 1). An event record, in general, may identify the computer operation, objects involved in the computer operation, and other information.

The cache manager 503 minimizes the performance impact of checking event records stored in the local storage 106. In one embodiment, the cache manager 503 stores in the cache memory 112 (shown in FIG. 1) information on objects that have already been detected and recorded in an event record (e.g., process id, process path, Sha1 and Md5 of the process) to allow for pre-filtering to reduce access to the local storage 106.

The storage manager 504 provides an interface to allow the accumulator 501 to inspect existing event records stored in the local storage 106. In one embodiment, the storage manager 504 stores, maintains, and accesses event records using the SQLite™ relational database management system. The storage manager 504 also provides an interface to allow a report manager 505 to query the local storage 106 to retrieve event records describing matched detection rules/root-cause chains for inclusion in a report.

When the object of the detected computer operation is not an initial object, the accumulator 501 checks existing event records to determine if the object may be linked to an already recorded object. In one embodiment, the accumulator 501 does so by first consulting with the cache manager 503 to check the cached event records, to determine if the object is present in an event record stored in the local storage 106 (FIG. 5, arrow 4). If so, the accumulator 501 checks the event records in the local storage 106 to determine if the computer operation involving the object links the object to another object that is recorded in the event record (FIG. 5, arrow 5). When the computer operation links the object to another object of an existing event record, the link between the object and the other object is deemed to have been established and the accumulator 501 updates the cache and the event record accordingly (FIG. 5, arrow 6). The accumulator 501 may consult with the rules manager 502 to determine if any of the event records satisfies all of its conditions. If so, the detection rule is deemed to have been fully matched and the threat identified by the detection rule is deemed to have been detected in the computer 100.

The report manager 505 provides an interface to allow the accumulator 501 to send notifications when a detection rule has been fully matched. In one embodiment, when the accumulator 501 determines that all the conditions of a detection rule have been satisfied, the accumulator 501 so informs the report manager 505 (FIG. 5, arrow 7). In response, the report manager 505 retrieves information on the detected computer operations from the local storage 106 (FIG. 5, arrow 8), generates a report that includes the information on the detected computer operations, and sends the report to the server 250 (FIG. 5, arrow 9).

Figure 6:
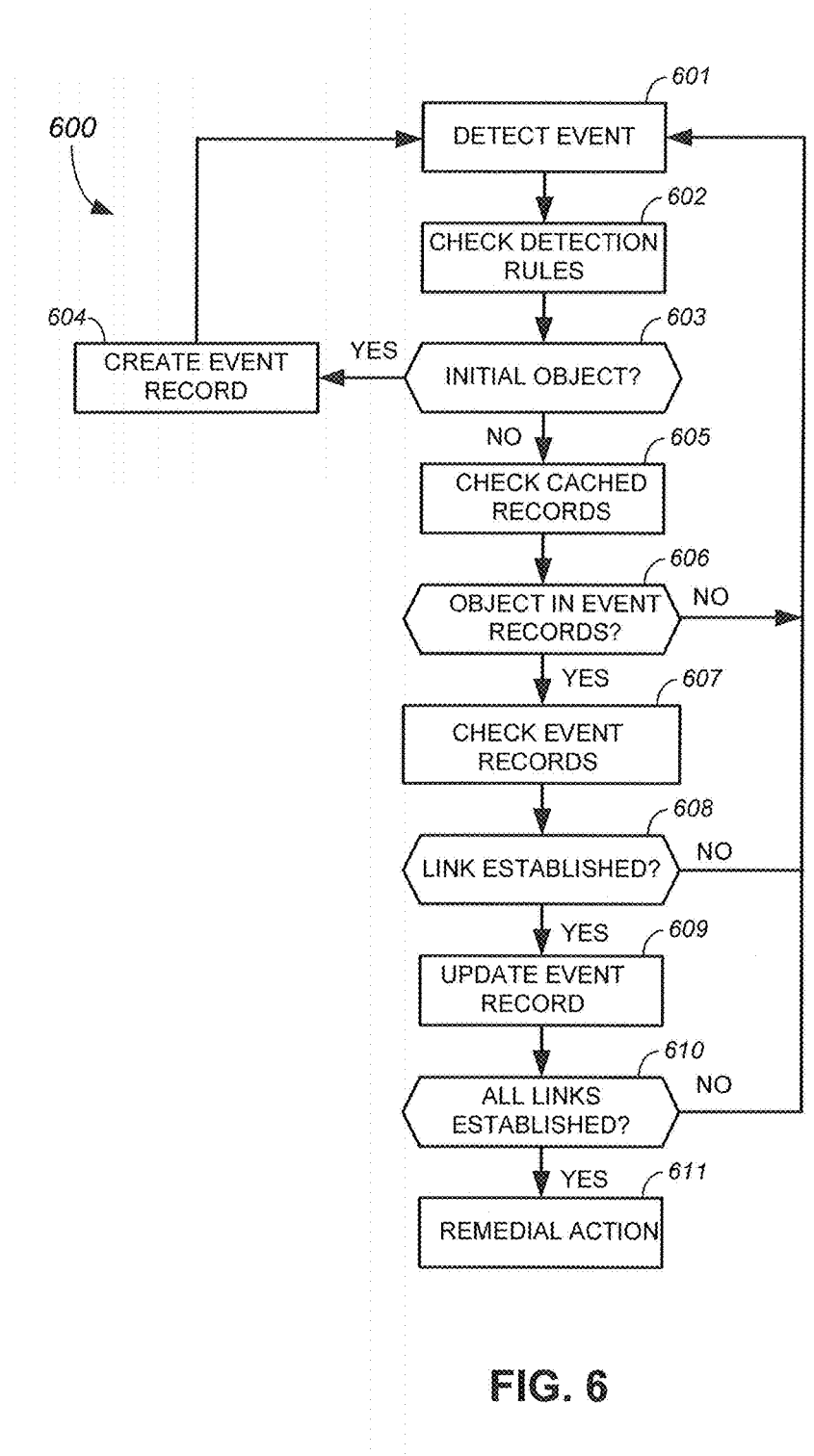
FIG. 6 shows a flow diagram of a method of detecting computer security threats in accordance with an embodiment of the present invention.

FIG. 6 shows a flow diagram of a method 600 of detecting computer security threats in accordance with an embodiment of the present invention. The method 600 may be performed by the computer 100. More particularly, the memory 108 of the computer 100 may store instructions of the threat detector 110 that when executed by the processor 101 of the computer 100 causes the computer 100 to perform the steps of the method of 600. As can be appreciated, the method 600 may also be performed using other components without detracting from the merits of the present invention.

In the example of FIG. 6, the accumulator 501 (shown in FIG. 5) registers with the kernel driver 510 to receive notifications when one or more computer operations defined in a plurality of detection rules occur in the computer 100. When a computer operation registered by the accumulator 501 is detected by the kernel driver 510 (step 601), the kernel driver 510 so notifies the accumulator 501. In response to the detection of the computer operation, the accumulator 501 checks the detection rules to determine if an object of the computer operation is an initial object in a detection rule (step 602). If so, the accumulator 501 creates a new event record for the computer operation (step 603 to step 604) and continues to wait for registered computer operations to be detected in the computer 100 (step 604 to step 601). Otherwise, the accumulator 501 checks the cache of event records to determine if the object is recorded in an event record stored in the local storage (step 605). If so, the accumulator 501 checks the event records stored in the local storage (step 606 to step 607). Otherwise, the accumulator 501 continues to wait for registered computer operations to be detected in the computer 100 (step 606 to step 601).

The accumulator 501 checks the event records in the local storage to determine whether the object can be linked to another object in the event records (step 607). More particularly, the accumulator 501 checks whether the computer operation is performed by the object in conjunction with another object that is recorded in the event records stored in the local storage. If so, a link between the object and the other object has been established (step 608 to step 609). Otherwise, the accumulator 501 continues to wait for registered computer operations to be detected in the computer 100 (step 608 to step 601).

The accumulator 501 updates the corresponding event record in the local storage and the cache of event records when the computer operation establishes the link between the object and another object (step 608 to step 609). The accumulator checks the event record if all the links in the corresponding detection rule have been established (step 610). If not, the accumulator 501 continues to wait for registered computer operations to be detected in the computer 100 (step 610 to step 601).

If all the links in the detection rule have been established, the threat defined by the detection rule is deemed to have been detected in the computer 100. In that case, in response to detection of the threat, a remedial action is performed (step 610 to step 611). The remedial action may include sending a report to the server 250 to alert the administrator, place the computer 100 in locked down mode, block the initial object, consult/update a reputation database, etc.

Methods and systems for detecting computer security threats have been disclosed. While specific embodiments of the present invention have been provided, it is to be understood that these embodiments are for illustration purposes and not limiting.

Many additional embodiments will be apparent to persons of ordinary skill in the art reading this disclosure.

What is claimed is:

1. A computer-implemented method of detecting computer security threats, the method comprising:
   in a first computer, detecting a first computer operation performed by a first object with a second object;
   in response to detecting the first computer operation, searching a plurality of detection rules that each comprises a plurality of objects that are linked by computer operations, identifying a first detection rule that describes the first object being linked to the second object by the first computer operation, and establishing a first link between the first object and the second object in the first detection rule, wherein the first detection rule further describes the second object being linked to a third object by a second computer operation;
   after detecting the first computer operation, detecting the second computer operation performed by the second object with the third object in the first computer;
   in response to detecting the second computer operation, verifying that the second object in the first computer operation is the second object in the second computer operation, and establishing a second link between the second object and the third object in the first detection rule; and
   detecting presence in the first computer of a first computer security threat defined by the first detection rule based at least on establishing the first and second links in the first detection rule.

2. The method of claim 1, wherein the first object comprises a first process, the second object comprises a second process, and the first computer operation comprises the first process injecting the second process.

3. The method of claim 2, wherein the first process injects the second process with malicious code in the first computer operation.

4. The method of claim 1, further comprising:
   detecting a third computer operation performed by the third object with a fourth object in the first computer;
   in response to detecting the third computer operation, verifying that the third object in the third computer operation is the third object in the second computer operation, and establishing a third link between the third object and the fourth object in the first detection rule; and
   detecting the presence of the first computer security threat in the first computer based at least on establishing the first, second, and third links in the first detection rule.

5. The method of claim 1, further comprising:
   sending a report to a server when the first computer security threat defined by the first detection rule is detected to be present in the first computer.

6. A computer comprising a processor and a memory, the memory comprising instructions that when executed by the processor causes the computer to perform the steps of:
   detecting a first computer operation performed by a first object with a second object;
   in response to detecting the first computer operation, searching a plurality of detection rules that each comprises a plurality of objects that are linked by computer operations, identifying a first detection rule that describes the first object being linked to the second object by the first computer operation, and establishing a first link between the first object and the second object in the first detection rule, wherein the first detection rule further describes the second object being linked to a third object by a second computer operation;

after detecting the first computer operation, detecting the second computer operation performed by the second object with the third object;

in response to detecting the second computer operation, verifying that the second object in the first computer operation is the second object in the second computer operation, and establishing a second link between the second object and the third object in the first detection rule; and identifying presence of a first computer security threat defined by the first detection rule based at least on establishing the first and second links in the first detection rule.

7. The computer of claim 6, wherein the first object comprises a first process, the second object comprises a second process, and the first computer operation comprises the first process injecting the second process.

8. The computer of claim 7, wherein the first process injects the second process with malicious code in the first computer operation.

9. The computer of claim 7, wherein when the processor executes the instructions in the memory, the computer further performs the steps of:

detecting a third computer operation performed by the third object with a fourth object;

in response to detecting the third computer operation, verifying that the third object in the third computer operation is the third object in the second computer operation, and establishing a third link between the third object and the fourth object in the first detection rule; and identifying the presence of the first computer security threat based at least on establishing the first, second, and third links in the first detection rule.

10. The computer of claim 7, wherein when the processor executes the instructions in the memory, the computer further performs the step of:

sending a report to a server when the first computer security threat defined by the first detection rule is identified in the computer.

11. A computer-implemented method of detecting computer security threats in a computer, the method comprising:

detecting a first computer operation performed between a first object and a second object;

in response to detecting the first computer operation, creating an event record indicating the first computer operation, wherein the first computer operation between the first object and the second object is described as a first link in a first detection rule in a plurality of detection rules, the first detection rule further describing a second computer operation between the second object and a third object as a second link in the first detection rule;

indicating in the event record that the first link in the first detection rule has been established;

after detecting the first computer operation, detecting the second computer operation between the second object and the third object;

in response to detecting the second computer operation, checking a plurality of event records for the event record that includes the second object;

in response to verifying that the second object in the first computer operation is the second object in the second computer operation, establishing the second link between the second object and the third object;

updating the event record to indicate that the second link in the first detection rule has been established; and identifying presence of a threat defined by the first detection rule in the computer based at least on establishment of the first and second links in the first detection rule.

12. The computer-implemented method of claim 11, wherein checking the plurality of event records comprises:

storing the event record in a local storage of the computer;

caching the event record in a cache memory of the computer to generate a cached event record;

checking the cached event record for information on the second object; and checking the plurality of event records in the local storage when the cached event record indicates that the second object is recorded in the cached event records.

* * * * *